United States Patent
Hayasaki et al.

(10) Patent No.: US 9,304,478 B2
(45) Date of Patent: Apr. 5, 2016

(54) POWER SUPPLY APPARATUS AND IMAGE FORMING APPARATUS

(71) Applicant: CANON KABUSHIKI KAISHA, Tokyo (JP)

(72) Inventors: Minoru Hayasaki, Mishima (JP); Nobuyuki Uchiyama, Mishima (JP); Aoji Isono, Naka-gun (JP); Takashi Kawana, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/565,975

(22) Filed: Dec. 10, 2014

(65) Prior Publication Data
US 2015/0180349 A1 Jun. 25, 2015

(30) Foreign Application Priority Data
Dec. 24, 2013 (JP) .................. 2013-265541

(51) Int. Cl.
G03G 15/00 (2006.01)
H02M 1/44 (2007.01)
H02M 3/335 (2006.01)
H02M 1/00 (2007.01)

(52) U.S. Cl.
CPC ............. *G03G 15/80* (2013.01); *H02M 1/44* (2013.01); *H02M 3/33569* (2013.01); *H02M 3/33523* (2013.01); *H02M 2001/0058* (2013.01)

(58) Field of Classification Search
CPC ................. G03G 15/80; H02M 3/33507
See application file for complete search history.

(56) References Cited

U.S. PATENT DOCUMENTS

| | | | |
|---|---|---|---|
| 8,242,873 B2 | 8/2012 | Hayasaki et al. | |
| 8,503,197 B2 | 8/2013 | Hayasaki et al. | |
| 8,880,911 B2 | 11/2014 | Karino et al. | |
| 2013/0236206 A1 | 9/2013 | Shoji et al. | |
| 2013/0307917 A1 | 11/2013 | Hayasaki et al. | |
| 2014/0233267 A1* | 8/2014 | Jin et al. .................... | 363/21.02 |
| 2014/0254210 A1 | 9/2014 | Hayasaki et al. | |
| 2014/0369086 A1 | 12/2014 | Hayasaki | |

FOREIGN PATENT DOCUMENTS

JP 02-81212 A 3/1990

OTHER PUBLICATIONS

U.S. Appl. No. 14/546,588, filed by Nobuyuki Uchiyama on Nov. 18, 2014.

* cited by examiner

*Primary Examiner* — Sandra Brase
(74) *Attorney, Agent, or Firm* — Fitzpatrick, Cella, Harper & Scinto

(57) ABSTRACT

The power supply apparatus includes a first capacitor and a second capacitor that insulate a primary side and a secondary side of the power supply apparatus from each other. The power supply apparatus further includes an inductor, a first switch element connected to the inductor and to the first capacitor, and a second switch element connected to the inductor and to the second capacitor. The power supply apparatus controls the first switch element and the second switch element so that, when the first switch element is turned on, the second switch element is turned on.

17 Claims, 8 Drawing Sheets

PRIOR ART

POWER SUPPLY APPARATUS AND IMAGE FORMING APPARATUS

BACKGROUND OF THE INVENTION

1. Field of the Invention

The present invention relates to a power supply apparatus and an image forming apparatus, and more particularly, to an insulated DC-to-DC converter for obtaining power under a state in which direct current voltages each obtained by rectifying and smoothening an alternating voltage are insulated from each other, as a switching DC-to-DC converter that achieves such insulation through capacitors.

2. Description of the Related Art

In an insulated DC-to-DC converter for transmitting power while insulation is secured between a primary circuit electrically connected to an alternate current power supply and a secondary circuit directly connected to a user accessible portion, a transformer is used in general. On the other hand, for example, in Japanese Patent Application Laid-Open No. H02-081212, there is proposed a power conversion system using not a transformer that once converts electrical energy into magnetic energy but capacitors that convert electrical energy into electric field energy to secure insulation.

However, in Japanese Patent Application Laid-Open No. H02-081212, one output terminal is connected to a grounding point (hereinafter referred to as GND). Therefore, with regard to the capacitors that perform the insulation and power supply, only a part of a current that flows from one of the capacitors flows into another of the capacitors, and the two capacitors lack in balance. As a result, the rest of the current that flows from the one capacitor flows out of the apparatus via GND, and thus, various measures are necessary against electro-magnetic interference (EMI), in particular, a noise terminal voltage.

SUMMARY OF THE INVENTION

The present invention is to prevent electromagnetic noise.

(1) In order to solve the problem described above, according to one embodiment of the present invention, there is provided a power supply apparatus including: a rectification unit configured to rectify an alternating voltage; a smoothing unit configured to smooth the voltage rectified by the rectification unit; a first capacitor and a second capacitor configured to insulate a primary side and a secondary side thereof from each other; a first switch element having one end connected to one pole of the smoothing unit; a first inductor connected to another end of the first switch element; a first control unit configured to control on and off of the first switch element; a second switch element having one end connected to another pole of the smoothing unit; a second inductor connected to another end of the second switch element; and a second control unit configured to control on and off of the second switch element. The first capacitor is connected to a node between the first switch element and the first inductor, and the second capacitor is connected to a node between the second switch element and the second inductor.

(2) According to one embodiment of the present invention, there is provided a power supply apparatus including: a rectification unit configured to rectify an alternating voltage; a smoothing unit configured to smooth the voltage rectified by the rectification unit; a first capacitor and a second capacitor configured to insulate a primary side and a secondary side thereof from each other; a first switch element having one end connected to one pole of the smoothing unit; a second switch element having one end connected to another pole of the smoothing unit; an inductor connected between another end of the first switch element and another end of the second switch element; a first control unit configured to control on and off of the first switch element; and a second control unit configured to control on and off of the second switch element. The first capacitor is connected to a node between the first switch element and the first inductor, and the second capacitor is connected to a node between the second switch element and the second inductor.

(3) According to one embodiment of the present invention, there is provided a power supply apparatus including: a rectification unit configured to rectify an alternating voltage; a smoothing unit configured to smooth the voltage rectified by the rectification unit; a transformer configured to insulate a primary side and a secondary side thereof from each other; a first switch element having one end connected to one pole of the smoothing unit; a second switch element having one end connected to another pole of the smoothing unit and another end connected to another end of the first switch element; a first capacitor having one end connected to a node between the first switch element and the second switch element and another end connected to a primary winding of the transformer; a second capacitor having one end connected to the one end of the second switch element and another end connected to the primary winding of the transformer; and a control unit configured to control on and off of the first switch element and the second switch element.

(4) According to one embodiment of the present invention, there is provided an image forming apparatus including an image forming unit configured to form an image on a recording material and the power supply apparatus according to any one of Items (1) to (3).

Further features of the present invention will become apparent from the following description of exemplary embodiments with reference to the attached drawings.

DESCRIPTION OF THE EMBODIMENTS

Figures 1A, 1B:
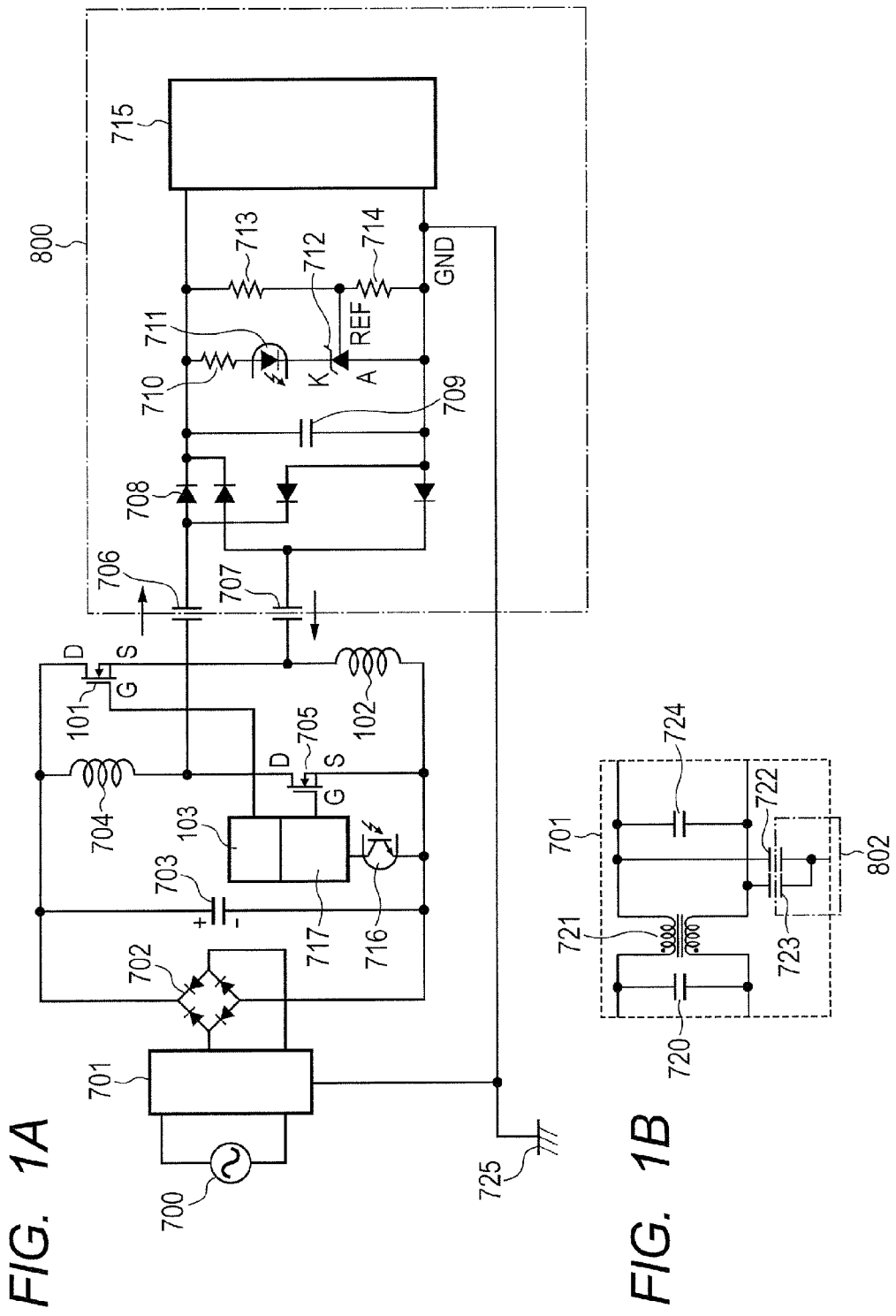
FIG. 1A illustrates a structure of a power supply apparatus of according to a first embodiment of the present invention.
FIG. 1B is an enlarged diagram of a filter circuit unit of the power supply apparatus of the first embodiment.

Modes for carrying out the present invention are described in detail in the following by way of embodiments with reference to the attached drawings.

Related-Art Power Supply Apparatus

For the sake of comparison with the embodiments described below, a structure of a related-art power supply apparatus is described with reference to FIG. 8A. An alternating voltage of a commercial alternate current power supply 700 is input through a filter circuit 701 to a diode bridge 702 to be rectified, and is then smoothed by a smoothing capacitor 703. An inductor 704 and a switch element 705 are connected to the smoothing capacitor 703. Line bypass capacitors (Y capacitors) (hereinafter simply referred to as capacitors) 706 and 707 insulate a primary circuit that is electrically directly connected to the commercial alternate current power supply 700 and a secondary circuit that is directly connected to a user accessible portion from each other. Further, the capacitors 706 and 707 are also capacitors that transmit power from a primary side to a secondary side.

Figure 8A:
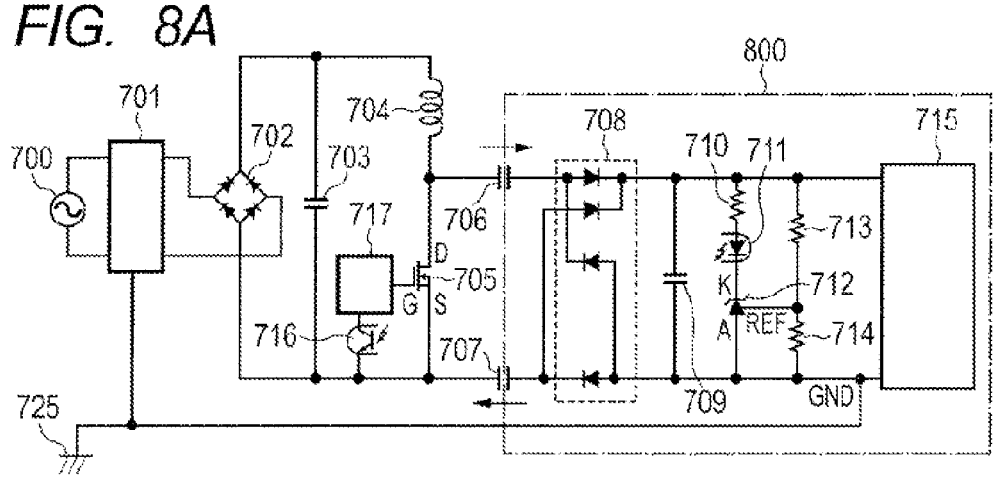
FIG. 8A illustrates a structure of a related-art power supply apparatus.
Figure 8B:
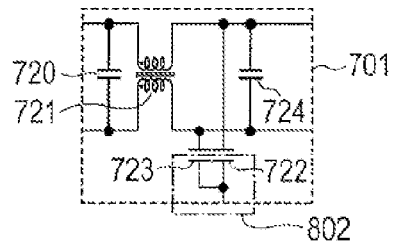
FIG. 8B is an enlarged diagram of a filter circuit unit of the related-art power supply apparatus.

FIG. 8B illustrates an exemplary internal circuit of the filter circuit 701. The filter circuit 701 includes across-the-line capacitors 720 and 724 (X capacitors) and line bypass capacitors 722 and 723 (Y capacitors). Further, the filter circuit 701 includes a common mode choke coil 721. A portion 802 surrounded by a dot-and-dash line in FIG. 8B is the secondary side. Further, a frame ground 725 of the apparatus in FIG. 8A is connected via an inlet to the outside of the apparatus in the form of a ground wire, for example.

A load side with respect to the capacitors 706 and 707 (a portion 800 surrounded by a dot-and-dash line in FIG. 8A) and a circuit connected to a GND side with respect to the line bypass capacitors 722 and 723 of the filter circuit 701 (the portion 802 surrounded by the dot-and-dash line in FIG. 8B) are the secondary circuit. Other circuits, that is, a circuit on a side connected to the commercial alternate current power supply 700 with respect to the capacitors 706 and 707, and a circuit electrically connected to the commercial alternate current power supply 700 side with respect to the line bypass capacitors 722 and 723 are the primary circuit.

A switching control circuit 717 controls on or off of the switch element 705 by inputting a signal to a gate terminal G of the switch element 705. The switching control circuit 717 outputs a high level signal to the gate terminal G of the switch element 705 to turn on the switch element 705, and outputs a low level signal to the gate terminal G of the switch element 705 to turn off the switch element 705. When the switching control circuit 717 turns on the switch element 705, a current flows through the switch element 705, and a voltage between a source terminal S and a drain terminal D of the switch element 705 drops. Electric charges accumulated in the capacitors 706 and 707 flow through the switch element 705 while charging a capacitor 709. When the switch element 705 is turned on, a current also begins to flow through the inductor 704. An amount of the current that flows through the inductor 704 increases with time to accumulate magnetic energy in the inductor 704.

When the switching control circuit 717 turns off the switch element 705, the energy accumulated in the inductor 704 is discharged through the following path. The energy accumulated in the inductor 704 is discharged through the capacitor 706, a diode bridge 708 (a portion surrounded by a dotted line), the capacitor 709, the diode bridge 708, and then the capacitor 707. Energy is transmitted to the capacitor 709 arranged in the secondary circuit. By repeating such a series of operations, that is, through the on/off control of the switch element 705 by the switching control circuit 717, a voltage at the capacitor 709 rises. When the voltage at the capacitor 709 rises so that a voltage across a resistor 714 exceeds a voltage at an REF terminal of a shunt regulator 712, the shunt regulator 712 is brought into a conductive state and a current begins to flow therethrough. When the current begins to flow through the shunt regulator 712, a current flows through an LED 711 of a photocoupler and the LED 711 emits light.

The LED 711 of the photocoupler emits light in an amount corresponding to an amount of a current that flows therethrough, and a phototransistor 716 of the photocoupler causes a current to flow in an amount corresponding to the light amount, which is transmitted to the switching control circuit 717 as a signal. The switching control circuit 717 controls a time period during which the switch element 705 is turned on (on-width), that is, a time period during which a signal that is input to the gate terminal G is set at the high level, in accordance with the current that flows through the phototransistor 716 of the photocoupler. Note that, to be precise, the switching control circuit 717 detects the amount of the current by converting the current that flows through the phototransistor 716 of the photocoupler into a voltage.

As power is consumed by a load 715, the voltage at the capacitor 709 drops and the voltage across the resistor 714 drops below the voltage at the REF terminal of the shunt regulator 712. When the voltage across the resistor 714 drops below the voltage at the REF terminal of the shunt regulator 712, the shunt regulator 712 is brought into a non-conductive state, the LED 711 of the photocoupler stops emitting light, and no current flows through the phototransistor 716. When the current does not flow through the phototransistor 716, the switching control circuit 717 performs control so that the on-width of the switch element 705 increases to increase the power. Note that, the power supply apparatus includes resistors 710 and 713.

Operation Waveforms at Various Portions of Related-Art Circuit

Figure 9A:
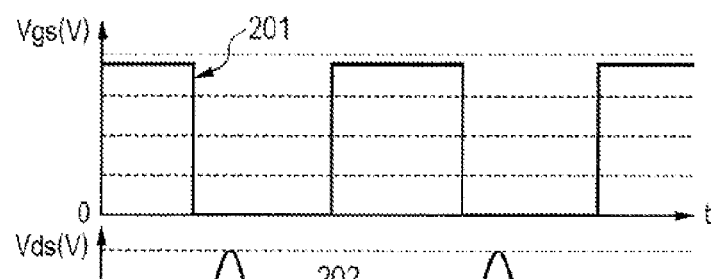
FIG. 9A is a graph showing a waveform of a voltage between a gate terminal and a source terminal of a switch element of the related-art power supply apparatus.
Figure 9B:
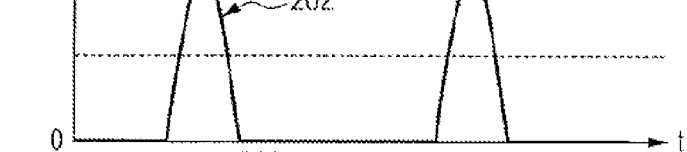
FIG. 9B is a graph showing a waveform of a voltage between a drain terminal and the source terminal of the switch element of the related-art power supply apparatus.
Figure 9C:
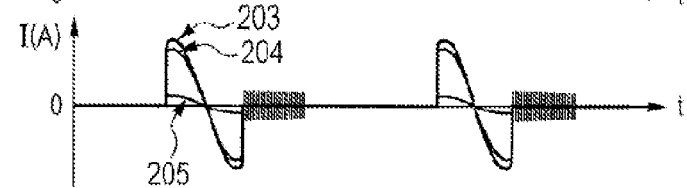
FIG. 9C is a graph showing a current that flows through a capacitor and a current that flows through a line from a GND terminal to the switch element of the related-art power supply apparatus.
Figure 9D:
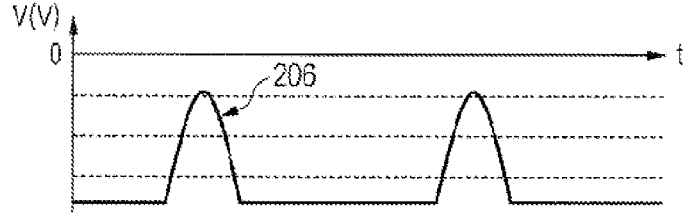
FIG. 9D is a graph showing a voltage at the GND terminal seen from the source terminal of the switch element of the related-art power supply apparatus.

FIGS. 9A to 9D show operation waveforms at various portions of the power supply apparatus illustrated in FIG. 8A and FIG. 8B. FIG. 9A shows a voltage Vgs (V) 201 between the gate terminal G and the source terminal S of the switch element 705. FIG. 9B shows a voltage Vds (V) 202 between the drain terminal D and the source terminal S of the switch element 705. FIG. 9C shows a current (A) 203 that flows through the capacitor 706, in which a direction of a current flowing from the drain terminal D of the switch element 705 to the capacitor 706 (direction of an arrow to the right in FIG. 8A) is a + direction. FIG. 9C also shows a current (A) 205 that flows through the capacitor 707, in which a direction of a current flowing from the GND terminal to the switch element 705 via the capacitor 707 (direction of an arrow to the left in FIG. 8A) is a + direction. FIG. 9C further shows a current (A) 204 that flows from the GND terminal to the primary circuit via the line bypass capacitors 722 and 723, in which a direction of a current flowing from the secondary circuit to the primary circuit is a + direction. FIG. 9D shows a voltage (V) 206 at the GND terminal seen from the source terminal S of the switch element 705, that is, the voltage (V) 206 at the GND terminal with reference to a potential of the source terminal S of the switch element 705. In FIG. 9A to FIG. 9D, the horizontal axis represents time (t).

When the switching control circuit 717 turns on the switch element 705, the voltage between the drain terminal D and the source terminal S of the switch element 705 drops. When the switching control circuit 717 turns off the switch element 705, voltage resonance occurs between the drain terminal D and the source terminal S of the switch element 705 and the voltage oscillates in a sinusoidal manner. This causes the voltage at the GND terminal to be a voltage divided by the capacitor 706 and a combination of the capacitors 707, 722, and 723. Therefore, as shown by the waveform 206 in FIG. 9D, in accordance with the switching control by the switching control circuit 717, the voltage at the GND terminal oscillates to a large extent. Most of the current 203 in FIG. 9C supplied from the capacitor 706 flows, as shown by the waveform 204, through the line bypass capacitors 722 and 723 connected as a filter 701. It can be seen that, as shown by the waveform 205 in FIG. 9C, only a current that is a difference between the currents of the waveforms 203 and 204 flows through the capacitor 707. In this way, in the power supply apparatus illustrated in FIG. 8A, a current that flows from the GND terminal to the primary circuit causes noise propagation via the frame ground 725 to the outside of the apparatus, which requires measures against electromagnetic noise such as EMI.

First Embodiment

Power Supply Apparatus

FIG. 1A and FIG. 1B illustrate a structure of a DC-to-DC converter as a power supply apparatus according to a first embodiment of the present invention. The same reference numerals are used to designate the same members as those in the related art described with reference to FIG. 8A, and description thereof is omitted. The power supply apparatus of this embodiment includes a second switch element 101 (hereinafter simply referred to as switch element 101), a second inductor 102 (hereinafter simply referred to as inductor 102), and a switching control circuit 103. Note that, in this embodiment, a switch element 705 is a first switch element, and an inductor 704 is a first inductor. One end (in this embodiment, a source terminal S) of the switch element 705 is connected to one pole (in this embodiment, a negative pole) of a smoothing capacitor 703, and another end (in this embodiment, a drain terminal D) of the switch element 705 is connected to one end of the inductor 704. Another end of the inductor 704 is connected to another pole of the smoothing capacitor 703. One end (in this embodiment, a drain terminal D) of the switch element 101 is connected to the another pole (in this embodiment, a positive pole) of the smoothing capacitor 703, and another end (in this embodiment, a source terminal S) of the switch element 101 is connected to one end of the inductor 102. Another end of the inductor 102 is connected to the one pole of the smoothing capacitor 703. A capacitor 706 is connected to a node between the switch element 705 and the inductor 704, and a capacitor 707 is connected to a node between the switch element 101 and the inductor 102.

As the inductor 102, an inductor having the same inductance as that of the inductor 704 is used. Further, the switching control circuit 103 controls the switch element 101 so that the switch element 101 and the switch element 705 are turned on or off at the same timing in synchronization with each other. The switching control circuit 103 includes a high withstand voltage driver unit for driving a voltage higher than a voltage at the source terminal S of the switch element 101, and a voltage supply unit for supplying a voltage to a gate terminal G of the switch element 101. The voltage supply unit for supplying a voltage to the gate terminal G of the switch element 101 may be a general bootstrap circuit.

Operation Waveforms at Various Portions of Circuit of this Embodiment

Figure 2A:
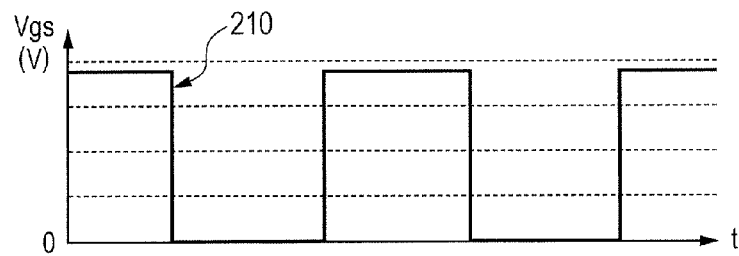
FIG. 2A is a graph showing a waveform of a voltage between a gate terminal and a source terminal of a first switch element of the power supply apparatus of the first embodiment.
Figure 2B:
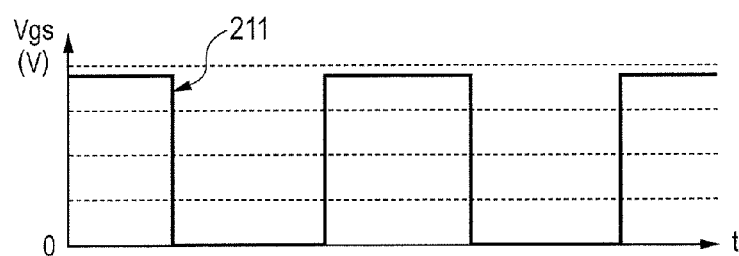
FIG. 2B is a graph showing a waveform of a voltage between a gate terminal and a source terminal of a second switch element of the power supply apparatus of the first embodiment.
Figure 2C:
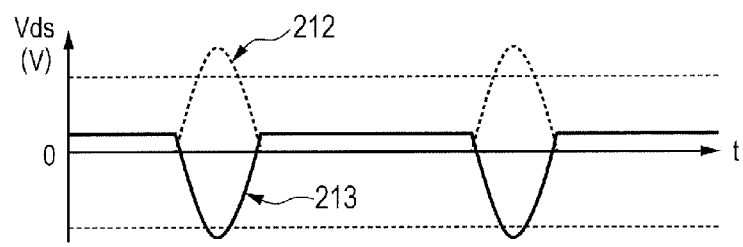
FIG. 2C is a graph showing a waveform of a voltage at a drain terminal of the first switch element of the power supply apparatus of the first embodiment.
Figure 2D:
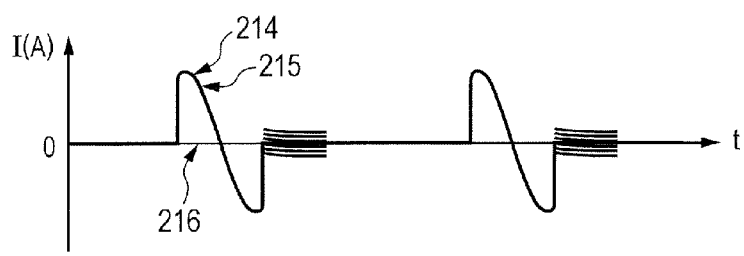
FIG. 2D is a graph showing currents that flow through capacitors and a current that flows through a line from a GND terminal to a filter circuit of the power supply apparatus of the first embodiment.
Figure 2E:
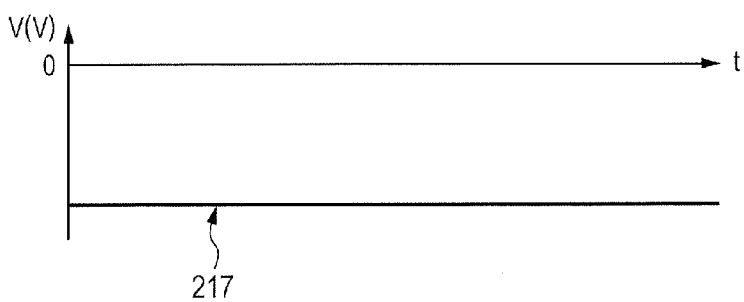
FIG. 2E is a graph showing a voltage at the GND terminal seen from the source terminal of the first switch element of the power supply apparatus of the first embodiment.

FIGS. 2A to 2E show operation waveforms at various portions of the power supply apparatus illustrated in FIGS. 1A and 1B. FIG. 2A shows a voltage Vgs (V) 210 between a gate terminal G and the source terminal S of the switch element 705, which corresponds to the waveform 201 in FIG. 9A. FIG. 2B shows a voltage Vgs (V) 211 between the gate terminal G and the source terminal S of the switch element 101. FIG. 2C shows a voltage Vds (V) 212 at the drain terminal D of the switch element 705, which is indicated by a dotted line and corresponds to the waveform 202 in FIG. 9B. FIG. 2C also shows a voltage Vds (V) 213 at the source terminal S of the switch element 101, which is indicated by a solid line. FIG. 2D shows currents I (A) 214 and 215 that flow through the capacitors 706 and 707, respectively, in which the + directions are directions of respective arrows, similarly to the case of FIG. 9C described above. FIG. 2D further shows a current (A) 216 that flows through a line from the GND terminal to a filter circuit 701. The waveforms 214, 215, and 216 in FIG. 2D correspond to the waveforms 203, 205, and 204 in FIG. 9C, respectively. FIG. 2E shows a voltage (V) 217 at the GND terminal seen from the source terminal S of the switch element 705, which corresponds to the waveform 206 in FIG. 9D. In FIG. 2A to FIG. 2E, the horizontal axis represents time (t).

By forming the power supply apparatus of this embodiment as illustrated in FIGS. 1A and 1B, when the switch element 705 and the switch element 101 are turned on in synchronization with each other, the following occurs. A voltage at the node between the capacitor 706 and the inductor 704, that is, the voltage at the drain terminal D of the switch element 705, has the same potential as that of the negative pole (also referred to as − terminal) of the smoothing capacitor 703. Further, the voltage at the source terminal S of the switch element 101 has the same potential as that of the positive pole (also referred to as + terminal) of the smoothing capacitor 703. Therefore, the waveform 213 in FIG. 2C is not 0 V but has a predetermined value when both the switch element 705 and the switch element 101 are turned on. When the switch element 705 and the switch element 101 are turned off in synchronization with each other, the inductor 704 and the inductor 102 attempt to continue to cause currents to flow therethrough. Therefore, the voltage at the node between the inductor 704 and the capacitor 706 has, as shown by the waveform 212 in FIG. 2C, a resonance waveform of oscillating on the + side in the sinusoidal manner. Further, the voltage at the source terminal S of the switch element 101 has, as shown by the waveform 213 in FIG. 2C, a resonance waveform of oscillating on the − side in the sinusoidal manner.

As shown in FIG. 2D, the current 214 that flows in the direction of the arrow of the capacitor 706 and the current 215 that flows in the direction of the arrow of the capacitor 707 are almost the same. Further, the current 216 that flows from the GND terminal to the filter circuit 701 is almost 0 A. In this way, it can be seen that, in the power supply apparatus of this embodiment, the current that flows by switching operation of the switch element 705 and the switch element 101 flows back via the capacitors 706 and 707. Note that, when the switch element 705 and the switch element 101 are turned off, the current flows in the + direction (706→708→709→708→707→102→703). After that, the current flows in the − direction (102→707→708→709→708→706→704→703) (FIG. 2D).

In this way, in this embodiment, the current that flows from the GND terminal to the primary circuit via the line bypass capacitors 722 and 723 in the related art (204 in FIG. 9C) is reduced. Further, it can be seen that, as shown by the waveform 217 in FIG. 2E, the voltage at the GND terminal seen from the source terminal S of the switch element 705 does not oscillate by the switching operation of the switch element 705 and the switch element 101, but is stable. Therefore, the frame ground 725 is not influenced by the switching operation of the switch element 705 and the switch element 101 to reduce electromagnetic noise that is released to the outside of the apparatus.

As described above, in the power supply apparatus of this embodiment, the balance is achieved so that the voltage at the GND terminal (725) as the voltage at the secondary circuit does not vary by the switching operation of the switch elements of the primary circuit. This enables inhibition of electromagnetic noise involved in the switching operation of this embodiment. Note that, in this embodiment, the description is made of the structure in which the voltages transmitted by the capacitors 706 and 707 are full wave rectified by the diode bridge 708. However, the structure of this embodiment is merely exemplary, and other rectification systems may also be used. Further, with regard to feed back control for obtaining a predetermined output voltage of the power supply apparatus, for the sake of simplicity of the description, only the divided voltage of the resistors 713 and 714 and the shunt regulator 712 are used in the description. However, similarly to the case of general power supply control, phase correction may be performed.

In this embodiment, by adopting the structure in which the state in which currents flowing through the pair of capacitors (203 and 205 in FIG. 9C) lack in balance is eliminated, a current that flows from one of the capacitors flows through another of the capacitors. Therefore, the current that flows via GND out of the apparatus and is caused fundamentally in the related-art power supply apparatus can be reduced to inhibit the electromagnetic noise. As a result, a filter for inhibiting the EMI, in particular, a noise terminal voltage, can be reduced in size to enable formation of a small-sized, lightweight, and inexpensive power supply apparatus. As described above, according to this embodiment, electromagnetic noise can be inhibited.

Second Embodiment

Power Supply Apparatus

Figure 3:
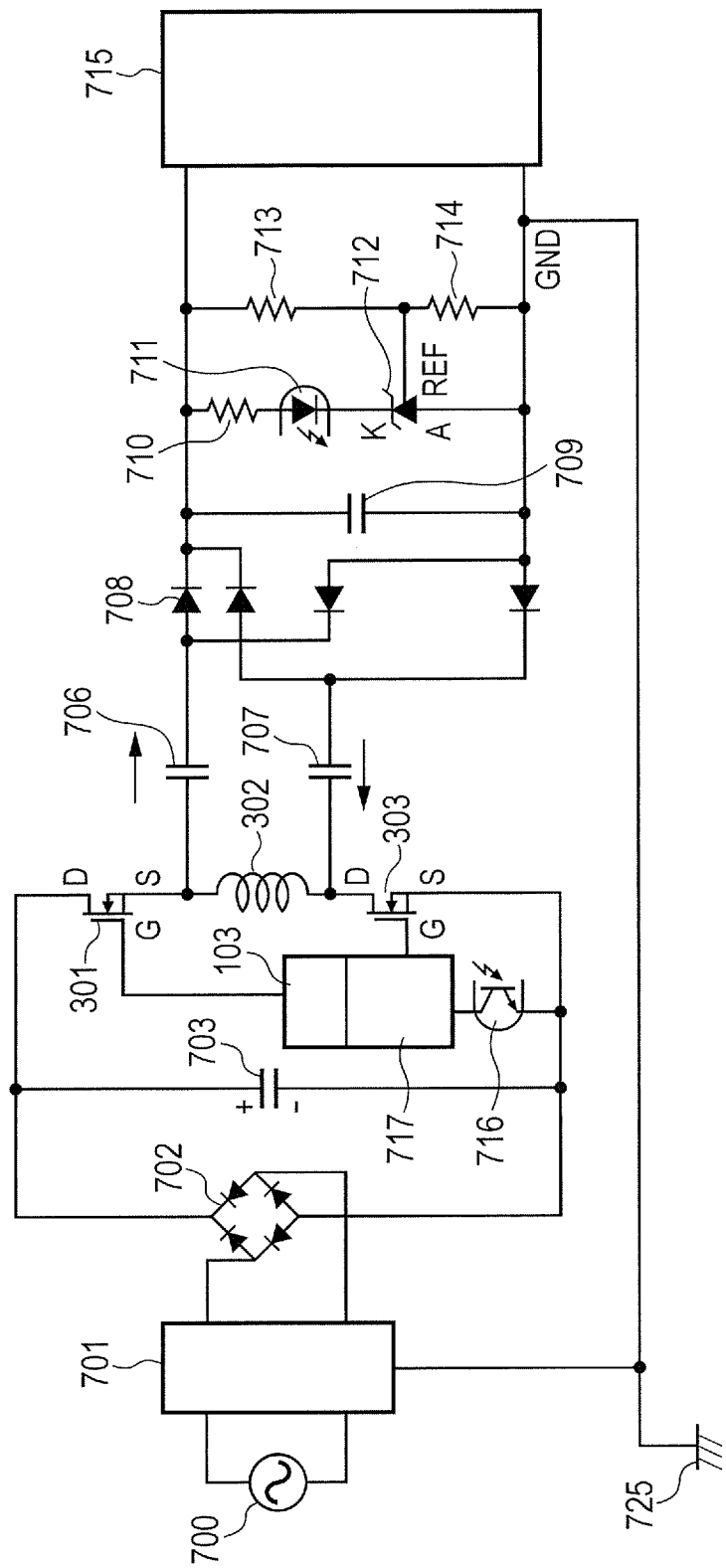
FIG. 3 illustrates a structure of a power supply apparatus of according to a second embodiment of the present invention.

FIG. 3 illustrates a structure of a DC-to-DC converter as a power supply apparatus according to a second embodiment of the present invention. The same reference numerals are used to designate the same members as those in the first embodiment, and description thereof is omitted. The power supply apparatus of this embodiment includes a first switch element 301 (hereinafter simply referred to as switch element 301), a second switch element 303 (hereinafter simply referred to as switch element 303), and an inductor 302. One end (in this embodiment, a drain terminal D) of the switch element 301 is connected to one pole (in this embodiment, a positive pole) of the smoothing capacitor 703. One end (in this embodiment, a source terminal S) of the switch element 303 is connected to another pole (in this embodiment, a negative pole) of the smoothing capacitor 703. The inductor 302 is connected between another end (in this embodiment, a source terminal S) of the switch element 301 and another end (in this embodiment, a drain terminal D) of the switch element 303. The capacitor 706 is connected to a node between the switch element 301 and the inductor 302, and the capacitor 707 is connected to a node between the switch element 303 and the inductor 302.

Further, the switching control circuit 103 controls switching operation of the switch element 301 by outputting a signal at the high level or at the low level to a gate terminal G of the switch element 301. On the other hand, the switching control circuit 717 controls switching operation of the switch element 303 by outputting a signal at the high level or at the low level to a gate terminal G of the switch element 303. Similarly to the case of the first embodiment, the switch elements 301 and 303 are controlled so as to be turned on and off in synchronization with each other.

Waveforms at Various Portions of Power Supply Apparatus

Figure 4A:
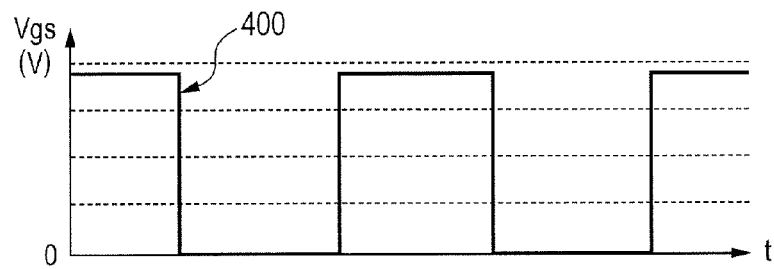
FIG. 4A is a graph showing a waveform of a voltage between a gate terminal and a source terminal of a first switch element of the power supply apparatus of the second embodiment.
Figure 4B:
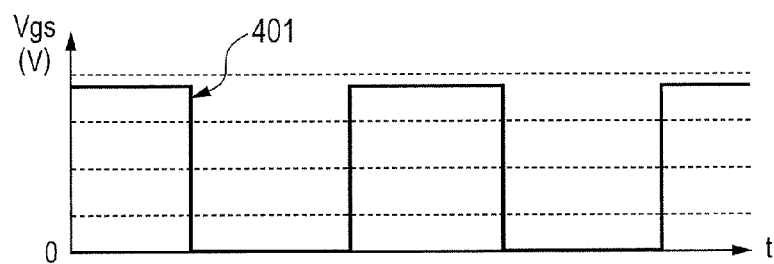
FIG. 4B is a graph showing a waveform of a voltage between a gate terminal and a source terminal of a second switch element of the power supply apparatus of the second embodiment.
Figure 4C:
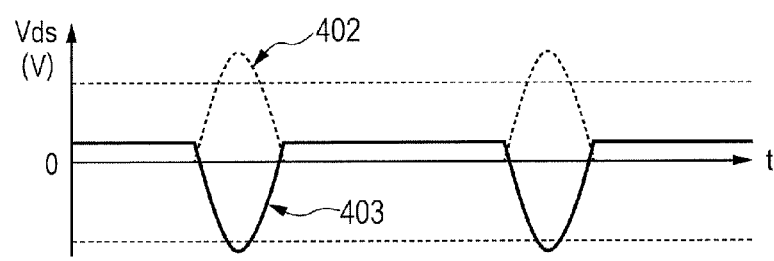
FIG. 4C is a graph showing a waveform of a voltage at a drain terminal of the first switch element of the power supply apparatus of the second embodiment.
Figure 4D:
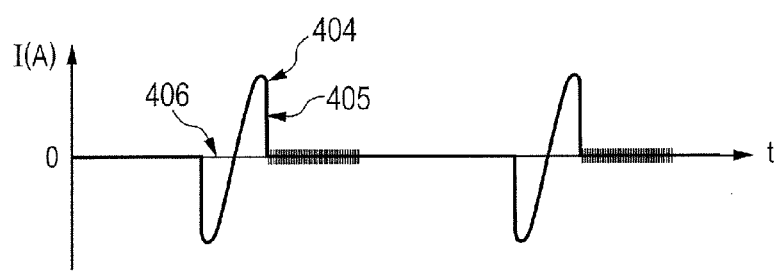
FIG. 4D is a graph showing currents that flow through capacitors and a current that flows through a line from a GND terminal to a filter circuit of the power supply apparatus of the second embodiment.
Figure 4E:
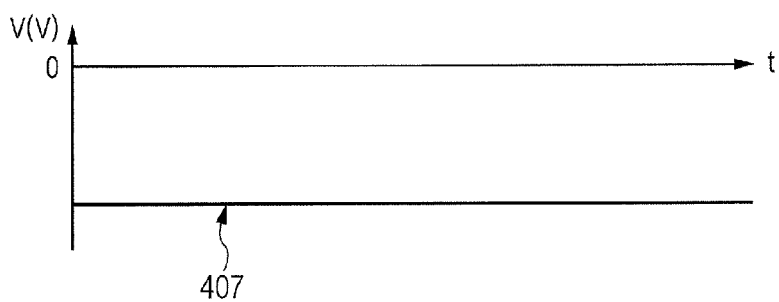
FIG. 4E is a graph showing a voltage at the GND terminal seen from the source terminal of the first switch element of the power supply apparatus of the second embodiment.

FIGS. 4A to 4E show waveforms at various portions when the circuit illustrated in FIG. 3 operates. FIG. 4A shows a voltage Vgs (V) 400 between the gate terminal G and the source terminal S of the switch element 301. FIG. 4B shows a voltage Vgs (V) 401 between the gate terminal G and the source terminal S of the switch element 303. FIG. 4C shows a voltage Vds (V) 402 at the drain terminal D with reference to a voltage at the source terminal S of the switch element 303, which is indicated by a dotted line. FIG. 4C also shows a voltage Vds (V) 403 at the drain terminal D of the switch element 301, which is indicated by a solid line. FIG. 4D shows a current 404 that flows through the capacitor 706, a current 405 that flows through the capacitor 707, and a current 406 that flows from the GND terminal to the filter circuit 701. FIG. 4E shows a voltage 407 (V) at the GND terminal seen from the source terminal of the switch element 303. In FIG. 4A to FIG. 4E, the horizontal axis represents time (t).

When the switch elements 301 and 303 are turned on, a voltage is applied to the inductor 302 and a current flows therethrough. A voltage at the drain terminal D of the switch element 303 has the same potential as that of the − terminal of the smoothing capacitor 703. Further, a voltage at the source terminal S of the switch element 301 has the same potential as that of the + terminal of the smoothing capacitor 703. Therefore, the voltage 403 in FIG. 4C is not 0 V but has a predetermined value when both the switch element 303 and the switch element 301 are turned on.

When the switch elements 301 and 303 are turned off simultaneously, the inductor 302 attempts to continue to cause a current to flow therethrough, and thus, a resonance voltage occurs by the capacitors 706 and 707 and the capacitor 709. When the switch elements 301 and 303 are turned off, a voltage across the inductor 302 rises, but a voltage across the inductor 302 can freely oscillate, and thus, the voltage at the GND terminal does not vary by the switching operation. Therefore, it can be seen that most of the current that flows through the capacitor 706 flows through the capacitor 707, and almost no current flows from the GND terminal to the filter circuit 701. Note that, when the switch elements 301 and 303 are turned off, first, a current flows in the − direction (707→708→709→708→706→302), and then, a current flows in the + direction (706→708→709→708→707→302) (FIG. 4D).

In the first embodiment, in order to reduce the electromagnetic noise by setting the current that flows through the capacitor 706 and the current that flows through the capacitor 707 to be the same, it is necessary to make uniform the characteristics of the two inductors. In this embodiment, only one inductor is used, and thus, there are advantages in that, not only the number of components can be reduced but also it is not necessary to make uniform the characteristics of inductors to be used.

As described above, with regard to the − terminal and the + terminal of the smoothing capacitor 703 of the primary circuit, the balance is achieved so that the voltage at the GND terminal of the secondary circuit does not oscillate by the switching. This enables inhibition of electromagnetic noise involved in the switching operation. In this way, according to this embodiment, electromagnetic noise can be inhibited.

Third Embodiment

Figure 5:
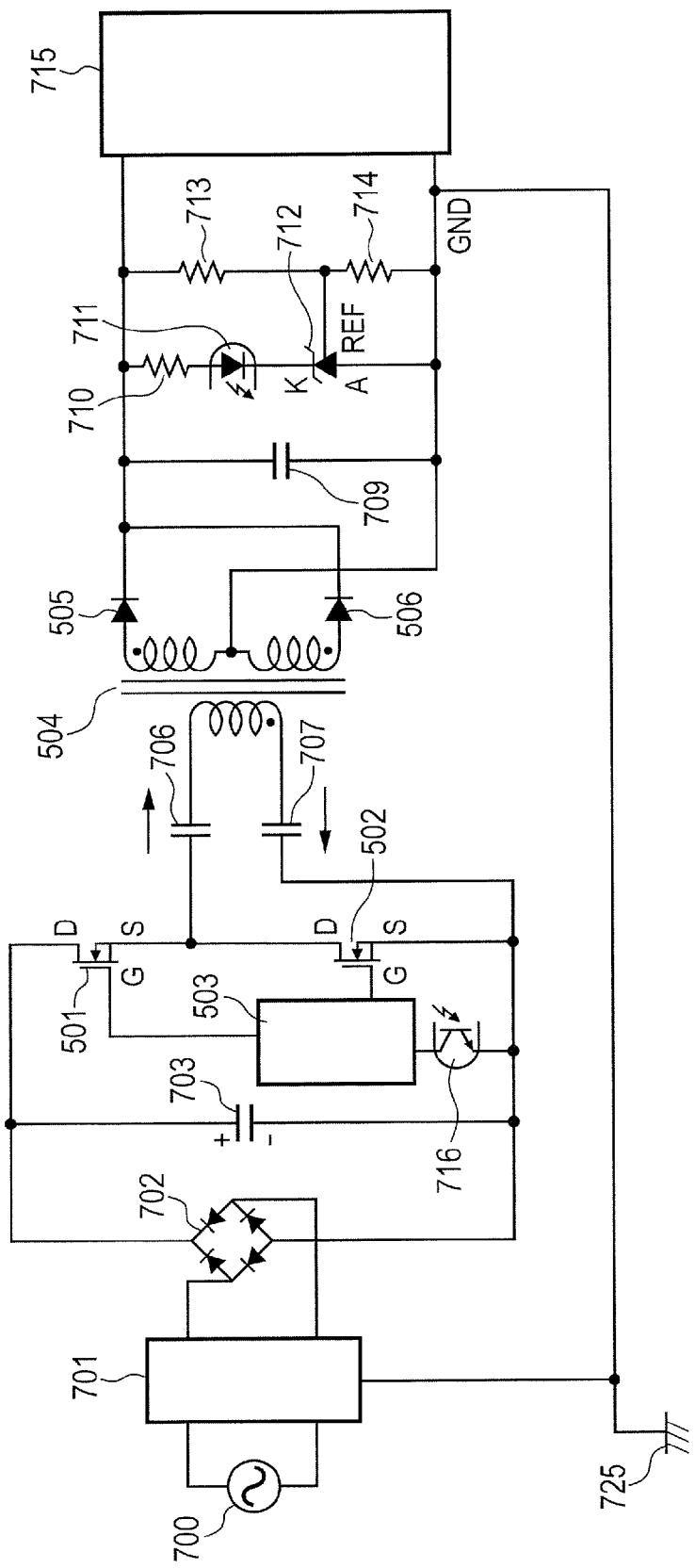
FIG. 5 illustrates a structure of a power supply apparatus according to a third embodiment of the present invention.

FIG. 5 illustrates a structure of a DC-to-DC converter as a power supply apparatus according to a third embodiment of the present invention. In the power supply apparatus of this embodiment, the primary side and the secondary side are insulated from each other by a transformer 504. The two capacitors 706 and 707 are configured to also have the insulation function so that an insulation length by the transformer 504 can be reduced or a grade of the insulation thereby can be lowered to enable reduction in size of the apparatus.

The power supply apparatus of this embodiment includes a first switch element 501 (hereinafter simply referred to as switch element 501), a second switch element 502 (hereinafter simply referred to as switch element 502), a switching control circuit 503, the transformer 504, and diodes 505 and 506. One end (in this embodiment, a drain terminal D) of the switch element 501 is connected to one pole (in this embodiment, a positive pole) of the smoothing capacitor 703. One end (in this embodiment, a source terminal S) of the switch element 502 is connected to another pole (in this embodiment, a negative pole) of the smoothing capacitor 703, and another end (in this embodiment, a drain terminal D) of the switch element 502 is connected to another end (in this embodiment, a source terminal S) of the switch element 501. One end of the capacitor 706 is connected to a node between the switch element 501 and the switch element 502, and another end of the capacitor 706 is connected to a primary winding of the transformer 504. One end of the capacitor 707 is connected to the one end (in this embodiment, the source terminal S) of the switch element 502, and another end of the capacitor 707 is connected to the primary winding of the transformer 504.

The switching control circuit 503 controls switching operation of both the switch elements 501 and 502 by outputting a signal at the high level or at the low level to a gate terminal G of the switch element 501 and a gate terminal G of the switch element 502. Note that, the same reference numerals are used to designate the same members as those in the first embodiment, and description thereof is omitted. In this embodiment, the two capacitors for the purposes of insulation and of reducing electromagnetic noise are applied to a current resonance power supply. Therefore, the switch element 501 and the switch element 502 have a half bridge structure, and the switching control circuit 503 operates the two switch elements so that, when one of the switch elements is turned on, another of the switch elements is turned off. Further, a time period during which both the switch elements are turned off, that is, a so-called dead time, is generally provided when the switch element makes a transition to an ON state or an OFF state. Specifically, the switch element 501 is turned on when the switch element 502 is turned off, but an on-width of the switch element 501 (a time period during which the switch element 501 is turned on) is shorter than an off-width of the switch element 502 (a time period during which the switch element 502 is turned off).

Figure 6A:
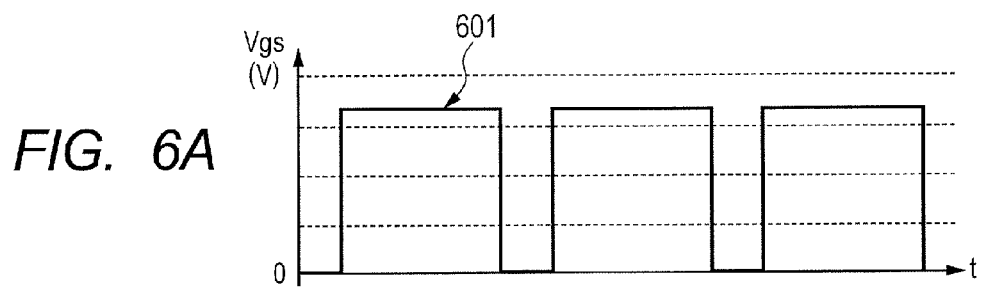
FIG. 6A is a graph showing a waveform of a voltage between a gate terminal and a source terminal of a first switch element of the power supply apparatus of the third embodiment.
Figure 6B:
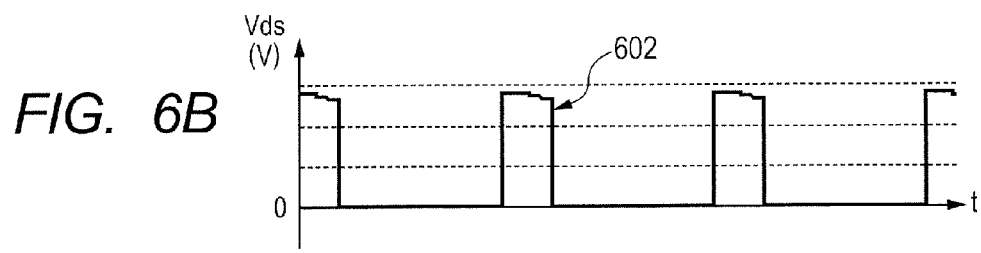
FIG. 6B is a graph showing a waveform of a voltage between a gate terminal and a source terminal of a second switch element of the power supply apparatus of the third embodiment.
Figure 6C:
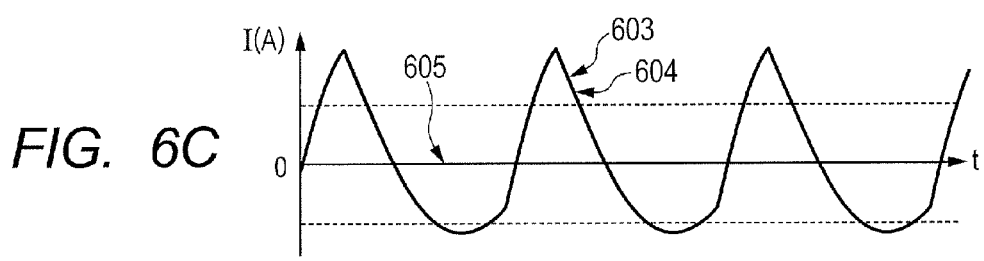
FIG. 6C is a graph showing currents that flow through capacitors and a current that flows through a line from a GND terminal to a filter circuit of the power supply apparatus of the third embodiment.

FIG. 6A to FIG. 6D show operation waveforms in the power supply apparatus illustrated in FIG. 5. FIG. 6A shows a voltage Vgs (V) 601 between the gate terminal G and the source terminal S of the switch element 502. FIG. 6B shows a voltage Vds (V) 602 between the drain terminal D and the source terminal S of the switch element 502. FIG. 6C shows a current (A) 603 that flows through the capacitor 706, and a current (A) 604 that flows through the capacitor 707. FIG. 6C also shows a current (A) 605 that flows from the GND terminal to the filter circuit 701. When the switch element 501 is turned off and the switch element 502 is turned on, a current first flows in the + direction (706→504→707→502), and after that, flows in the − direction (707→504→706→502) (FIG. 6C). When the switch element 501 is turned on and the switch element 502 is turned off, a current flows in the + direction (703→501→706→504→707→703) (FIG. 6C).

Figure 6D:
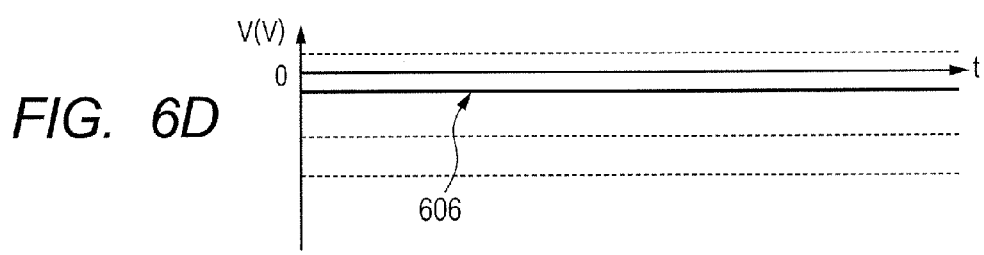
FIG. 6D is a graph showing a voltage at the GND terminal seen from the source terminal of the first switch element of the power supply apparatus of the third embodiment.

FIG. 6D shows a voltage (V) 606 at the GND terminal seen from the source terminal S of the switch element 502. As shown in FIG. 6D, it can be seen that almost no variations are caused in the voltage at the GND terminal even by the switching operation of the switch elements 501 and 502. In FIG. 6A to FIG. 6D, the horizontal axis represents time (t).

As described above, with regard to the − terminal and the + terminal of the smoothing capacitor 703 of the primary circuit, the balance is achieved so that the voltage at the GND terminal of the secondary circuit does not oscillate by the switching operation. This enables inhibition of electromagnetic noise involved in switching operation. In this way, according to this embodiment, electromagnetic noise can be inhibited. Further, according to this embodiment, even in an insulated power supply apparatus using a transformer, for example, an insulation length by the transformer can be reduced by using two capacitors for insulation, and thus, a smaller power supply apparatus can be formed. Further, for example, a barrier tape width of the transformer can be reduced and a portion around which a coil is wound can be increased, and thus, a smaller power supply apparatus with lower loss can be formed.

Fourth Embodiment

The power supply apparatus described in the first to third embodiments can be applied as, for example, a low voltage power supply, that is, a power supply for supplying power to a controller (control unit), sensors, or a drive unit such as a motor, of an image forming apparatus. A structure of an image forming apparatus to which the power supply apparatus according to any one of the first to third embodiments is applied is described in the following.

Structure of Image Forming Apparatus

Figure 7:
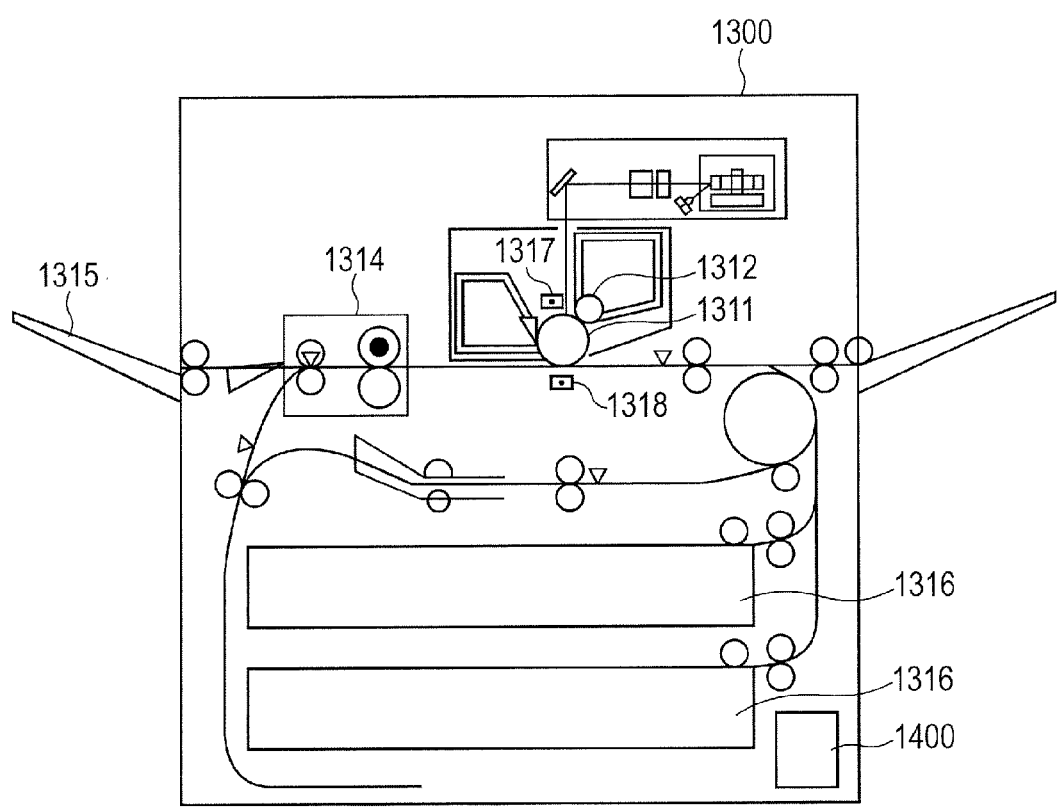
FIG. 7 illustrates a structure of an image forming apparatus according to a fourth embodiment of the present invention.

A laser beam printer is described as an example of the image forming apparatus. FIG. 7 illustrates a schematic structure of a laser beam printer as an example of an electrophotographic printer. A laser beam printer 1300 includes a photosensitive drum 1311 as an image bearing member on which an electrostatic latent image is formed, and a charging device 1317 (charge unit) for uniformly charging the photosensitive drum 1311. Further, the laser beam printer 1300 includes a developing device 1312 (developing unit) for developing with toner the electrostatic latent image formed on the photosensitive drum 1311. The toner image developed on the photosensitive drum 1311 is transferred by a transfer device 1318 (transfer unit) onto a sheet (not shown) as a recording material that is supplied from a cassette 1316, and the toner image transferred onto the sheet is fixed by a fuser 1314. Then, the sheet is discharged onto a tray 1315. The photosensitive drum 1311, the charging device 1317, the developing device 1312, and the transfer device 1318 form an image forming unit. Further, the laser beam printer 1300 includes a power supply apparatus 1400 described in any one of the first to third embodiments. Note that, an image forming apparatus to which the power supply apparatus 1400 according to any one of the first to third embodiments can be applied is not limited to the one illustrated in FIG. 7, and may be, for example, an image forming apparatus including a plurality of image forming units. Further, the image forming apparatus may be an image forming apparatus including a primary transfer device for transferring a toner image formed on the photosensitive drum 1311 onto an intermediate transfer belt, and a secondary transfer device for transferring the toner image formed on the intermediate transfer belt onto a sheet.

The laser beam printer 1300 includes a controller (not shown) for controlling image forming operation by the image forming unit and sheet conveying operation. The power supply apparatus 1400 described in any one of the first to third embodiments supplies power to, for example, the controller or sensors (not shown). Further, the power supply apparatus 1400 described in any one of the first to third embodiments supplies power to a drive unit such as a motor for rotating the photosensitive drum 1311, or for driving various kinds of rollers and the like for conveying the sheet. Specifically, the load 715 of any one of the first to third embodiments corresponds to a controller, sensors, or a drive unit. The image forming apparatus of this embodiment includes the power supply apparatus 1400 described in any one of the first to third embodiments, and thus, the voltage at the GND terminal 725 does not vary by the switching operation of the switch element on the primary side. Specifically, a current that flows through the capacitor 706 does not flow through the GND terminal but flows through the capacitor 707, and thus, a current that flows via the GND terminal to the outside of the apparatus can be reduced to inhibit electromagnetic noise.

As described above, according to this embodiment, electromagnetic noise can be inhibited. Further, in the image forming apparatus including the power supply apparatus according to the second embodiment, only one inductor is used, and thus, the number of components can be reduced. Still further, in the image forming apparatus including the power supply apparatus according to the third embodiment, the power supply apparatus can be reduced in size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-265541, filed Dec. 24, 2013, which is hereby incorporated by reference herein in its entirety.

What is claimed is:

1. A power supply apparatus, comprising:
   a first capacitor and a second capacitor, the first capacitor and the second capacitor insulating a primary side and a secondary side of the power supply apparatus from each other;
   an inductor;
   a first switch element connected to the inductor and to the first capacitor;
   a second switch element connected to the inductor and to the second capacitor; and
   a control unit configured to control the first switch element and the second switch element so that, when the first switch element is turned on, the second switch element is turned on.

2. A power supply apparatus according to claim 1, wherein the first capacitor is connected to one end of the inductor and to one end of the first switch element, and the second capacitor is connected to another end of the inductor and to one end of the second switch element.

3. A power supply apparatus according to claim 1, wherein the first capacitor and the second capacitor are connected to a rectification unit arranged on the secondary side.

4. A power supply apparatus according to claim 1, wherein the control unit controls the first switch element and the second switch element so that the first switch element and the second switch element are simultaneously turned on.

5. A power supply apparatus according to claim 1, wherein, in a case where power is supplied from the primary side to the secondary side, a current flows through the first capacitor from the primary side to the secondary side, and a current flows through the second capacitor from the secondary side to the primary side.

6. A power supply apparatus according to claim 1, wherein the first capacitor and the second capacitor comprise line bypass capacitors.

7. A power supply apparatus according to claim 1, wherein one of outputs of the power supply apparatus on the secondary side is connected to a grounding point.

8. A power supply apparatus, comprising:
   a first capacitor and a second capacitor configured to insulate a primary side and a secondary side of the power supply apparatus from each other;

a first inductor and a second inductor;
a first switch element connected to the first inductor and to the first capacitor;
a second switch element connected to the second inductor and to the second capacitor; and
a control unit configured to control the first switch element and the second switch element so that both the first switch element and the second switch element are turned on.

9. A power supply apparatus according to claim 8, wherein the first capacitor and the second capacitor are connected to a rectification unit arranged on the secondary side.

10. A power supply apparatus according to claim 8, wherein the control unit controls the first switch element and the second switch element so that the first switch element and the second switch element are simultaneously turned on.

11. A power supply apparatus according to claim 8, wherein, in a case where power is supplied from the primary side to the secondary side, a current flows through the first capacitor from the primary side to the secondary side and a current flows through the second capacitor from the secondary side to the primary side.

12. A power supply apparatus according to claim 8, wherein the first capacitor and the second capacitor comprise line bypass capacitors.

13. A power supply apparatus according to claim 8, wherein one of outputs of the power supply apparatus on the secondary side is connected to a grounding point.

14. An image forming apparatus, comprising:
an image forming unit configured to form an image; and
a power supply configured to supply power to the image forming apparatus,
the power supply comprising:
a first capacitor and a second capacitor, the first capacitor and the second capacitor insulating a primary side and a secondary side of the power supply from each other;
an inductor;
a first switch element connected to the inductor and to the first capacitor;
a second switch element connected to the inductor and to the second capacitor; and
a control unit configured to control the first switch element and the second switch element so that, in a case where the first switch element is turned on, the second switch element is turned on.

15. An image forming apparatus according to claim 14, further comprising:
a control unit configured to control the image forming unit; and
a drive unit configured to drive the image forming unit,
wherein the power supply supplies power to one of the control unit and the drive unit.

16. An image forming apparatus, comprising:
an image forming unit configured to form an image; and
a power supply comprising:
a first capacitor and a second capacitor, the first capacitor and the second capacitor insulating a primary side and a secondary side of the power supply from each other;
a first inductor and a second inductor;
a first switch element connected to the first inductor and to the first capacitor;
a second switch element connected to the second inductor and to the second capacitor; and
a control unit configured to control the first switch element and the second switch element so that both the first switch element and the second switch element are turned on.

17. An image forming apparatus according to claim 16, further comprising:
a control unit configured to control the image forming unit; and
a drive unit configured to drive the image forming unit,
wherein the power supply supplies power to one of the control unit and the drive unit.

\* \* \* \* \*